(12) United States Patent
Huang et al.

(10) Patent No.: US 11,606,058 B2
(45) Date of Patent: Mar. 14, 2023

(54) MOTOR, CONTROL METHOD, POWER SYSTEM, AND ELECTRIC VEHICLE

(71) Applicant: CONTEMPORARY AMPEREX TECHNOLOGY CO., LIMITED, Fujian (CN)

(72) Inventors: Xiaojian Huang, Fujian (CN); Zhimin Dan, Fujian (CN); Bao Li, Fujian (CN); Xiyang Zuo, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/878,424

(22) Filed: Aug. 1, 2022

(65) Prior Publication Data

US 2022/0368270 A1   Nov. 17, 2022

Related U.S. Application Data

(63) Continuation of application No. PCT/CN2020/106472, filed on Jul. 31, 2020.

(51) Int. Cl.
*H02P 29/60* (2016.01)
*B60L 50/60* (2019.01)
*B60L 58/27* (2019.01)

(52) U.S. Cl.
CPC .............. *H02P 29/60* (2016.02); *B60L 50/60* (2019.02); *B60L 58/27* (2019.02)

(58) Field of Classification Search
CPC ........... H02P 29/60; B60L 58/27; B60L 50/60
USPC ....................................................... 318/139
See application file for complete search history.

(56) References Cited

U.S. PATENT DOCUMENTS

| 2011/0048821 A1 | 3/2011 | Dial |
| 2012/0056575 A1 | 3/2012 | Dial |
| 2015/0321573 A1 | 11/2015 | Sato |

(Continued)

FOREIGN PATENT DOCUMENTS

| CN | 101944812 A | 1/2011 |
| CN | 102255459 A | 11/2011 |

(Continued)

OTHER PUBLICATIONS

Document ID: WO 2017214232 A1 Date Published: Dec. 14, 2017 Electric Motor Cooling System Graves Scott et al. (Year: 2017).*

(Continued)

*Primary Examiner* — Jorge L Carrasquillo
(74) *Attorney, Agent, or Firm* — Scully Scott Murphy & Presser

(57) ABSTRACT

Disclosed is a motor, a control method, a power system, and an electric vehicle. Each phase stator winding of the motor includes two sub-winding sets. When a traction battery needs to be heated, the two sub-winding sets of the motor store electrical energy and provide alternating currents to the traction battery through an inverter, so that the traction battery uses its internal resistance for heating. In addition, the two sub-winding sets generate opposite magnetic fields which cancel each other out, so that the strength of the magnetic field inside each phase stator winding and the air gap magnetic flux are reduced, thereby alleviating the heat generation and NVH problems of the motor.

10 Claims, 4 Drawing Sheets

(56) References Cited

U.S. PATENT DOCUMENTS

| | | | |
|---|---|---|---|
| 2016/0079903 A1* | 3/2016 | Hsu | H02P 25/092 318/254.2 |
| 2018/0083509 A1 | 3/2018 | Yang et al. | |
| 2018/0083515 A1 | 3/2018 | Graves et al. | |
| 2018/0091012 A1 | 3/2018 | Yang et al. | |
| 2020/0350796 A1 | 11/2020 | Yang et al. | |
| 2021/0367467 A1 | 11/2021 | Graves et al. | |
| 2022/0348094 A1* | 11/2022 | Pan | H02M 7/797 |

FOREIGN PATENT DOCUMENTS

| | | |
|---|---|---|
| CN | 104506006 A | 4/2015 |
| CN | 105762952 A | 7/2016 |
| CN | 106787495 A | 5/2017 |
| GB | 2509308 A | 7/2014 |
| JP | 2009089515 A | 4/2009 |
| WO | 2017214232 A1 | 12/2017 |

OTHER PUBLICATIONS

Document ID: WO 2017214234 A1 Date Published: Dec. 14, 2017 Electric Motor Cooling System Bellemare et al. (Year: 2017).*
Extended European Search Report dated Oct. 10, 2022 received in European Patent Application No. EP 20947458.4.
International Search Report dated Apr. 25, 2021 issued in PCT/CN2020/106472.
Written Opinion dated Apr. 25, 2021 issued in PCT/CN2020/106472.

* cited by examiner

MOTOR, CONTROL METHOD, POWER SYSTEM, AND ELECTRIC VEHICLE

CROSS-REFERENCE TO RELATED APPLICATIONS

This application is a continuation of International Application No. PCT/CN2020/106472, filed on Jul. 31, 2020, the disclosure of which is hereby incorporated by reference in its entirety.

TECHNICAL FIELD

This application relates to the field of electric vehicles, and more specifically, to a motor, a control method, a power system, and an electric vehicle.

BACKGROUND

Electric vehicles are vehicles powered by traction batteries. Limited by traction battery materials, traction batteries can stably exert optimal performance only at its rated cell temperature. Therefore, when an electric vehicle is to be used in an area where the cell temperature is low, the traction battery needs to be heated to the rated cell temperature.

Existing traction battery heating methods may include indirect heating and direct heating. The indirect heating refers to heating a traction battery through a heat source outside the traction battery. The direct heating refers to heating a traction battery from inside. A direct heating method currently proposed in the industry is to heat a traction battery by using a motor.

However, when the existing motor provides heating currents to the traction battery, severe rotor-generated heat and a motor NVH (full name Noise, Vibration, Harshness) problem may occur, which affects motor life and reduces passenger comfort. Therefore, the heat generation and NVH problems of the motor require an urgent solution.

SUMMARY

When an existing motor provides heating currents to a traction battery, severe heat is generated by a rotor, making long-term heating unsustainable. A serious motor NVH (full name Noise, Vibration, Harshness) problem also occurs, further reducing driver and passenger comfort.

An embodiment of this application provides a motor, a control method, a power system, and an electric vehicle, to resolve technical problems of a large amount of heat generated by a rotor and non-compliant motor NVH indicators when the motor operates for providing heating currents to a traction battery.

According to a first aspect, this application provides a motor, including: stator windings of M phases, where M is a positive integer, each phase stator winding includes a first sub-winding set and a second sub-winding set, and the motor is used to heat a traction battery; and when the motor heats the traction battery so as to energize the first sub-winding set and the second sub-winding set, a direction of a total magnetic field generated by the first sub-winding set is caused to be opposite to a direction of a total magnetic field generated by the second sub-winding set.

In some embodiments, the first sub-winding set includes a first sub-winding, the second sub-winding set includes a second sub-winding, the first sub-winding includes a head end and a tail end, and the second sub-winding includes a head end and a tail end, where when the motor heats the traction battery, the tail end of the first sub-winding is connected to the tail end of the second sub-winding.

According to this embodiment, the tail end of the first sub-winding is connected to the tail end of the second sub-winding, so that the direction of a total magnetic field of the first sub-winding set is opposite to the direction of a total magnetic field generated by the second sub-winding set, magnetic fields generated by the two winding sets cancel each other out, and the air gap magnetic flux approaches zero to alleviate the heat generation and NVH problems of the motor.

In some embodiments, the motor further includes: M sets of intra-phase switches, where each set of intra-phase switches includes a first intra-phase switch and a second intra-phase switch; and the first intra-phase switch is connected between the tail end of the first sub-winding and the head end of the second sub-winding in one phase stator winding, and the second intra-phase switch is connected between the tail end of the first sub-winding and the tail end of the second sub-winding in the phase stator winding.

According to this embodiment, two sets of intra-phase switches are set to implement connection type switching for the first sub-winding and the second sub-winding. In this way, when the motor heats the traction battery, the tail end of the first sub-winding can be connected to the tail end of the second sub-winding, so that magnetic fields generated by the two winding sets cancel each other out, and the air gap magnetic flux approaches zero to alleviate the heat generation and NVH problems of the motor.

In some embodiments, the motor further includes: M sets of inter-phase switches, where each set of inter-phase switches includes a first inter-phase switch and a second inter-phase switch; and the first inter-phase switch is connected between the head end of the second sub-winding of one phase stator winding and the head end of the second sub-winding of another phase stator winding, and the second inter-phase switch is connected between the tail end of the second sub-winding of the one phase stator winding and the tail end of the second sub-winding of the another phase stator winding.

According to this embodiment, two sets of inter-phase switches are set to implement connection type switching between the phase windings to adapt to different types of winding connections.

In some embodiments, the first sub-winding set includes N first sub-windings, and the second sub-winding set includes N second sub-windings, where N is an integer greater than 1; and when the motor heats the traction battery, a tail end of the $i^{th}$ first sub-winding is connected to a tail end of the $i^{th}$ second sub-winding, and a head end of the $j^{th}$ second sub-winding is connected to a head end of the $(j+1)^{th}$ first sub-winding, where $1 \leq i \leq N$, and $1 \leq j \leq N-1$.

According to this embodiment, multiple sub-windings may be set to increase heating power for the motor to heat the traction battery.

In some embodiments, a wire winding direction of each first sub-winding is the same as a wire winding direction of each second sub-winding.

In some embodiments, the motor further includes a rotor; and when the motor heats the traction battery, the rotor is at rest.

According to a second aspect, this application provides a heating control method, applied to the motor according to any one of claims 1 to 7, where the motor is connected to a traction battery through an inverter, the motor includes stator windings of M phases, and each phase stator winding includes a first sub-winding and a second sub-winding, and the method includes:

receiving a cell temperature of the traction battery and operating state information of the motor;

determining whether a heating condition is met based on the cell temperature and the operating state information; and connecting a tail end of the first sub-winding to a tail end of the second sub-winding under the condition that a determining result is yes.

In some embodiment, after the connecting a tail end of the first sub-winding to a tail end of the second sub-winding under the condition that a determining result is yes, the method further includes:

controlling a state of the inverter, so that when the traction battery energizes the first sub-winding and the second sub-winding, a direction of a total magnetic field generated by the first sub-winding set is opposite to a direction of a total magnetic field generated by the second sub-winding set.

In some embodiments, the motor further includes: M sets of inter-phase switches and M sets of intra-phase switches, where each set of inter-phase switches includes a first inter-phase switch and a second inter-phase switch, and each set of intra-phase switches includes a first intra-phase switch and a second intra-phase switch; and the connecting a tail end of the first sub-winding to a tail end of the second sub-winding under the condition that a determining result is yes specifically includes:

closing the second intra-phase switch in each set of intra-phase switches and the first inter-phase switch in each set of inter-phase switches.

According to a third aspect, this application provides a power system, where the system includes: a traction battery, an inverter, and the motor according to the first aspect and optional solutions, and the motor heats the traction battery through the inverter.

According to a fourth aspect, this application provides an electric vehicle, including a power system, where the power system includes: a traction battery, an inverter, and the motor according to the first aspect and optional solutions, and the motor heats the traction battery through the inverter.

This application provides a motor, a control method, a power system, and an electric vehicle. The motor is connected to a traction battery through an inverter. Each phase stator winding of the motor includes two sub-winding sets. When the traction battery needs to be heated, the two sub-winding sets in the motor serve as energy storage elements to provide alternating currents to the traction battery, so that the traction battery uses its internal resistance to generate heat. In addition, the two sub-winding sets generate opposite magnetic fields which cancel each other out, so that the strength of the magnetic fields inside the stator windings and the air gap magnetic flux are reduced, thereby alleviating the heat generation and NVH problems of the motor.

DESCRIPTION OF EMBODIMENTS

To make the objectives, technical solutions, and advantages of the embodiments of this application clearer, the following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

Figure 1:
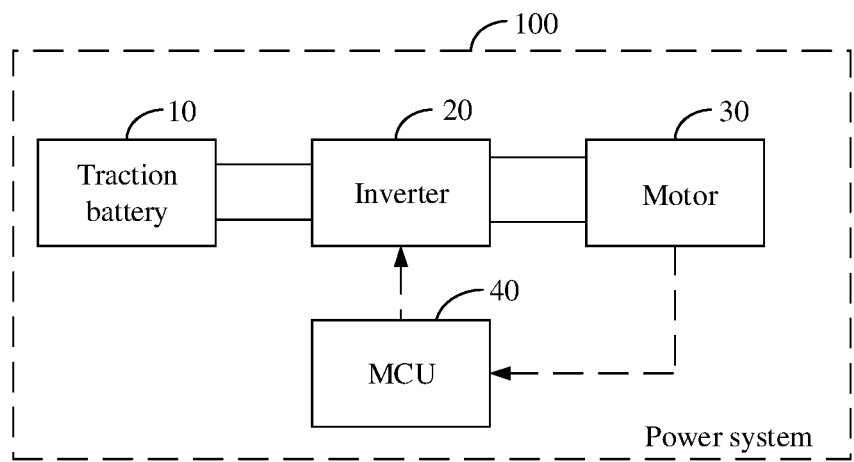
FIG. 1 is a schematic circuit diagram of a power system of an electric vehicle according to this application.

Electric vehicles are vehicles powered by traction batteries. As shown in FIG. 1, a power system 100 of an electric vehicle includes a traction battery 10, an inverter 20, a motor 30, and a motor controller unit (MCU) 40. Positive and negative electrodes of the traction battery 10 are connected to a direct current side of the inverter 300, and an alternating current side of the inverter 20 is connected to a stator winding of the motor 30. When the electric vehicle is running, the traction battery 10 supplies electrical energy to the motor 30 through the inverter 20, and the motor outputs power to drive the vehicle. The MCU 40 has a plurality of input terminals for receiving motor operating state data and a motor control instruction. The MCU 40 generates a pulse width modulation (PWM) signal according to the motor control instruction, the motor operating state data, and traction battery operating state data, and controls the inverter to provide voltage and current to the motor 30 to control a motor speed, so as to control a driving speed of the vehicle.

Figure 2:
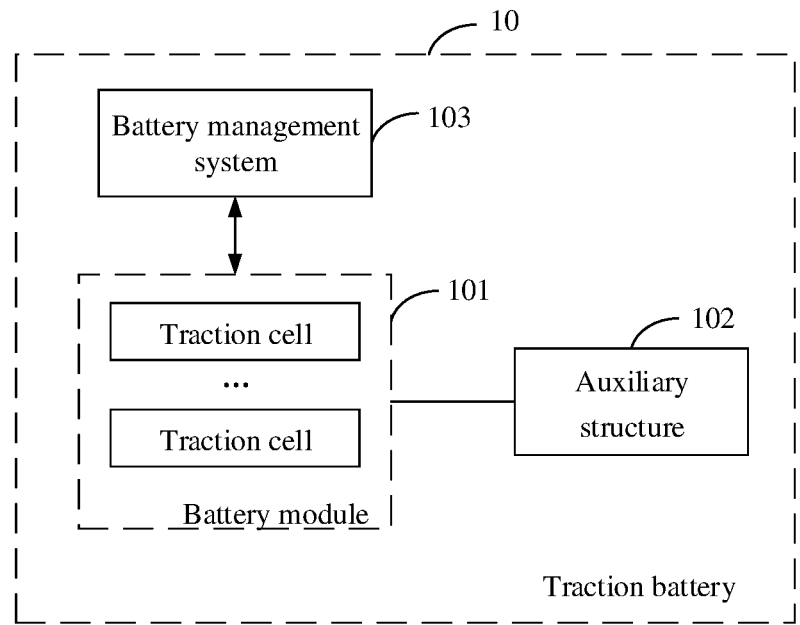
FIG. 2 is a functional block diagram of a power system according to this application.

As shown in FIG. 2, the traction battery 10 includes a battery module 101, an auxiliary structure 102, and a battery management system 103. The battery module 101 has a plurality of traction cells connected in series and parallel. The traction cells are core components of the traction battery, and also a source of electrical energy provided by the traction battery. The common auxiliary structure 102 includes an external frame, a fixture, an electrical connector, and an isolation component. Main functions of the battery management system 103 include charge and discharge management, high voltage control, battery state evaluation, battery data acquisition, and battery thermal management.

The battery management system 103 is configured to ensure that the traction battery operates within a suitable temperature range. Main functions of the battery thermal management system include accurate battery temperature measurement and monitoring, active cooling upon excessively high temperature of a battery pack, rapid heating upon excessively low temperature, for example, below a temperature threshold, and uniform temperature field distribution guarantee for the battery pack. Limited by traction battery materials, traction batteries can stably exert optimal performance only under its rated cell temperature. Therefore, when a traction battery is to be used in an environment where the cell temperature is low, the traction battery needs to be heated to the rated cell temperature.

Existing traction battery heating methods may include indirect heating and direct heating. The indirect heating refers to heating a traction battery through a heat source outside the traction battery. An indirect heating method may be air heating, liquid heating, heating using a heating film, or the like. For different heating sources, heating rates of a battery may be different. Because the battery is heated by an external heat source, heat loss occurs on a heat transfer medium, and the efficiency of indirect heating is not high. The direct heating refers to heating a traction battery from inside. A direct heating method currently proposed in the industry is to heat a traction battery by using a motor.

However, when an existing motor provides heating currents to a traction battery, a rotor generates severe heat, long-term heating cannot be maintained, and a motor NVH problem also occurs. NVH is an abbreviation of Noise, Vibration, and Harshness. NVH is an important indicator used to measure the vehicle comfort performance.

This application provides a motor, a control method, a power system, and an electric vehicle, to resolve the foregoing problems. The inventive concept of this application is: When a motor is used to directly heat a battery, a conventional mode of the motor changes, resulting in an extremely uneven air gap magnetic flux density distribution in the motor in this mode. Consequently, a rotor generates severe heat, long-term heating cannot be maintained, and a motor NVH problem also occurs. To resolve the problem of the extremely uneven magnetic flux density distribution, a stator winding is split into two sub-winding sets in this application based on the foregoing analysis. When the motor outputs power, directions of magnetic fields generated by the two sub-winding sets are the same, the magnetic fields inside the motor are evenly distributed to provide power to the vehicle. When the motor is used as an inductor in a heating circuit of the traction battery, the directions of the magnetic fields generated by the two sub-winding sets are opposite, so that the magnetic fields cancel each other out, and the magnetic fields inside a winding of each phase are reduced, which in turn reduces the air gap magnetic flux density, and the magnetic density on the rotor becomes very low to reduce heat generated by the rotor. Motor vibration is related to the non-uniform air gap magnetic flux density and distribution. Due to decrease in the air gap magnetic flux density, the motor NVH problem caused by non-uniform magnetic field distribution has also been suppressed to some extent.

The following focuses on a structure of a motor in a first embodiment of this application. The motor in this application includes: stator windings of M phases, a stator core, and a rotor, where M is a positive integer. The stator winding is configured to be connected to an inverter.

The stator winding is wound around the stator core, and may be a concentrated winding or a distributed winding, which is not limited herein. Each phase stator winding includes a first sub-winding set and a second sub-winding set.

The motor has two operating modes: heating mode and power output mode. Heating mode means that the stator winding in the motor is used as an energy storage element to provide alternating currents to the traction battery, so that the traction battery uses its internal resistance to generate heat and heat itself. Power output mode refers to a case in which the motor outputs mechanical power.

When the motor operates in power output mode and energizes the first sub-winding set and the second sub-winding set, a direction of a total magnetic field generated by the first sub-winding set is the same as a direction of a total magnetic field generated by the second sub-winding set. The total magnetic field generated by the first sub-winding set and the total magnetic field generated by the second sub-winding set are superimposed and become stronger, and jointly interact with the rotor to output power.

When the motor heats the traction battery and energizes the first sub-winding set and the second sub-winding set, a direction of a total magnetic field generated by the first sub-winding set is opposite to a direction of a total magnetic field generated by the second sub-winding set, the total magnetic field generated by the first sub-winding set and the total magnetic field generated by the second sub-winding set cancel each other out, a magnetic field generated by the stator winding approaches zero, the air gap magnetic flux density is reduced, and the magnetic density on the rotor becomes lower.

The following analyzes how the heat generated by a rotor and motor vibration are reduced. The formula for calculating a rotor eddy-current loss is as follows:

$$P_C = K_C f^2 B_S^2$$

where, $P_C$ represents the rotor eddy-current loss, $K_C$ is an eddy-current loss coefficient, f is a current frequency, and $B_S$ is a rotor flux density amplitude.

Based on the foregoing formula, the rotor eddy-current loss is proportional to the second power of the rotor magnetic flux density. With the decrease in the rotor magnetic flux density, the rotor eddy-current loss is squared down, and the heating power is reduced, so that problems of rotor temperature rise and inability to keep long-term self-heating can be resolved. In addition, the motor vibration is related to the uneven air gap magnetic flux density distribution. When the air gap magnetic flux density approaches zero, the motor vibration noise caused by uneven magnetic field distribution is also significantly reduced.

For the motor according to this embodiment of this application, when the motor operates in heating mode, the two sub-winding sets generate opposite magnetic fields, and the magnetic fields cancel each other out. A total magnetic field can be controlled to be within a reasonable threshold range, so that NVH requirements can be met in a process of heating the traction battery by using the motor. In addition, the NVH requirements can be met in the heating process through settings of the motor, reducing the difficulty of motor control.

A motor according to a second embodiment of this application is described below by using an example in which the first sub-winding set and the second sub-winding set each include only one sub-winding, and a wire winding direction of the first sub-winding is the same as a wire winding direction of the second sub-winding. The motor according to this embodiment of this application includes: stator windings of M phases, a stator core, and a rotor.

Each phase stator winding includes a first sub-winding set and a second sub-winding set. The first sub-winding set includes a first sub-winding, the second sub-winding set includes a second sub-winding, and a wire winding direction of the first sub-winding is the same as a wire winding direction of the second sub-winding. Both the first sub-winding and the second sub-winding are provided with a head end and a tail end, where an end at which winding starts or ends is taken as the head end, and the other end is called the tail end.

A head end of a first sub-winding of each phase stator winding is configured to be connected to an inverter. When the motor is in power output mode, a tail end of the first sub-winding is connected to a head end of a second sub-winding. In addition, a wire winding direction of the first sub-winding is the same as a wire winding direction of the second sub-winding, so that a direction of a magnetic field generated by the first sub-winding set is the same as a direction of a magnetic field generated by the second sub-winding set. The magnetic fields generated by the two sub-windings are superimposed, a magnetic field generated by the stator winding interacts with a magnetic field generated by the rotor, and the rotor is driven to rotate to output power.

When the motor is in heating mode, the motor rotor is fixed, so that the tail end of the first sub-winding is connected to the tail end of the second sub-winding. The motor controller unit inputs a PWM signal to a control terminal of the inverter, and a closed circuit is formed by the traction battery, the inverter, and the stator winding, where the stator winding stores electrical energy. Due to the inductance characteristic of the stator winding, the stator winding applies alternating current excitation to the battery, and the traction battery uses its own internal resistance for heating. Because the tail end of the first sub-winding is connected to the tail end of the second sub-winding, and the wire winding direction of the first sub-winding is the same as the wire winding direction of the second sub-winding, a direction of a magnetic field generated by the first sub-winding set is opposite to a direction of a magnetic field generated by the second sub-winding set, the magnetic fields generated by the two sub-windings cancel each other out, a magnetic field generated by the stator winding approaches zero, the air gap magnetic flux density is reduced, and the magnetic density on the rotor becomes lower.

In some embodiments, the number of turns of each first sub-winding is the same as the number of turns of each second sub-winding, and the first sub-winding and the second sub-winding may be wound with a same type of wire. With the foregoing settings, a total magnetic field in the first sub-winding set and a total magnetic field in the second sub-winding set may be entirely canceled, the magnetic flux density of the air gap approaches zero, and an amount of heat generated by the rotor may approach zero. It should be noted that the first sub-winding and the second sub-winding alternatively may be wound with different types of wire. The number of turns of the first sub-winding may alternatively be different from that of the second sub-winding, which is not limited herein.

Figure 3:
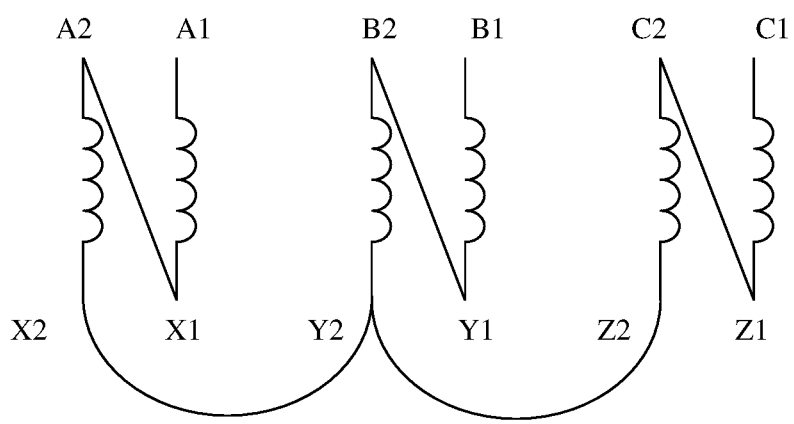
FIG. 3 is a schematic diagram of stator winding connection of a motor according to a second embodiment of this application in power output mode.

The following describes the stator windings of the motor by using a three-phase motor as an example. The stator windings are wound according to a conventional wire winding method. The phase A winding, the phase B winding, and the phase C winding each need to be divided into two sub-windings. The division may be performed by cutting off each phase winding, or each phase winding can be divided into two sub-windings and wound during the winding process. As shown in FIG. 3, a divided phase A winding includes a first sub-winding A1X1 and a second sub-winding A2X2, a divided phase B winding includes a first sub-winding B1Y1 and a second sub-winding B2Y2, and a divided phase C winding includes a first sub-winding C1Z1 and a second sub-winding C2Z2.

Still referring to FIG. 3, when the motor operates in power output mode, the sub-windings in each phase winding are connected in series. A tail end X1 of the first sub-winding A1X1 is connected to a head end A2 of the second sub-winding A2X2, a tail end Y1 of the first sub-winding B1Y1 is connected to a head end B2 of the second sub-winding B2Y2, and a tail end Z1 of the first sub-winding C1Z1 is connected to a head end C2 of the second sub-winding C2Z2. A direction of a magnetic field generated by the first sub-winding set is the same as a direction of a magnetic field generated by the second sub-winding set. The magnetic fields generated by the two sub-windings are superimposed, a magnetic field generated by the stator winding interacts with a magnetic field generated by the rotor, and the rotor is driven to rotate to output power.

Figure 4:
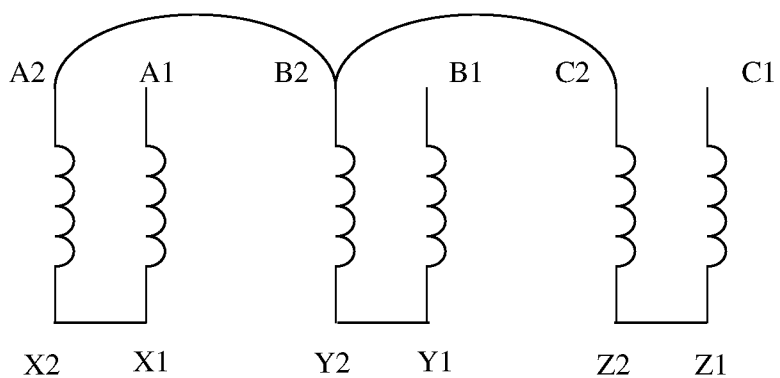
FIG. 4 is a schematic diagram of stator winding connection of a motor according to a second embodiment of this application in heating mode.

As shown in FIG. 4, when the motor operates in heating mode, the sub-windings of each phase winding are connected in parallel. A tail end X1 of the first sub-winding A1X1 is connected to a tail end X2 of the second sub-winding A2X2, a tail end Y1 of the first sub-winding B1Y1 is connected to a tail end Y2 of the second sub-winding B2Y2, and a tail end Z1 of the first sub-winding C1Z1 is connected to a tail end Z2 of the second sub-winding C2Z2. A direction of a magnetic field generated by the first sub-winding set is opposite to a direction of a magnetic field generated by the second sub-winding set. The magnetic fields generated by the two sub-windings entirely or partially cancel each other out, magnetic fields generated by the stator windings are reduced, the air gap magnetic flux density is reduced, the magnetic density on the rotor is reduced, and motor vibration and heat generated by the rotor are reduced accordingly. When the magnetic fields generated by the two windings are theoretically entirely canceled by setting the number of turns and the wires of the two sub-windings, the magnetic fields generated by the stator windings approach zero, the magnetic density on the rotor can be ignored, and motor vibration and heat generated by the rotor are significantly reduced.

In some embodiments, when the motor operates in heating mode, the two sub-winding sets generate opposite magnetic fields, the magnetic fields are entirely canceled, the strength of the magnetic field inside each phase stator winding approaches zero, the air gap magnetic flux is reduced, and motor vibration and heat generated by the rotor are reduced accordingly.

For the motor according to this embodiment of this application, when the motor operates in heating mode, the first sub-winding and the second sub-winding generate opposite magnetic fields which cancel each other out. A total magnetic field is controlled to be within a reasonable threshold range, so that NVH requirements can be met in a process of heating the traction battery by using the motor. In addition, the NVH requirements can be met in the heating process through settings of the motor, reducing the difficulty of motor control.

The following focuses on a structure of a motor in a third embodiment of this application. The motor in this embodiment of this application includes stator windings of M phases. Different from the motor in the first embodiment, the motor in this embodiment further includes: M sets of intra-phase switches and M sets of inter-phase switches, where each set of intra-phase switches includes a first intra-phase switch and a second intra-phase switch; and each set of inter-phase switches includes a first inter-phase switch and a second inter-phase switch.

The first intra-phase switch is connected between a tail end of a first sub-winding and a head end of a second sub-winding in one phase stator winding, and the second intra-phase switch is connected between the tail end of the first sub-winding and a tail end of the second sub-winding in the phase stator winding. The first inter-phase switch is connected between a head end of a second sub-winding of one phase stator winding and a head end of a second sub-winding of another phase stator winding, and the second inter-phase switch is connected between a tail end of the second sub-winding of the one phase stator winding and a tail end of the second sub-winding of the another phase stator winding.

The motor further includes a motor controller unit. The motor controller unit is configured to control the M sets of intra-phase switches and the M sets of inter-phase switches to close or open, implementing connection type switching for the first sub-winding and the second sub-winding.

When the motor operates in power output mode, the motor controller unit closes the first intra-phase switch in each set of intra-phase switches and the second inter-phase switch in each set of inter-phase switches, and the tail end of the first sub-winding is connected to the head end of the second sub-winding. A direction of a magnetic field generated by the first sub-winding set is the same as a direction of a magnetic field generated by the second sub-winding set. The magnetic fields generated by the two sub-windings are superimposed, a magnetic field generated by the stator winding interacts with a magnetic field generated by the rotor, and the rotor is driven to rotate to output power.

When the motor operates in heating mode, the motor controller unit closes the second intra-phase switch in each set of intra-phase switches and the first inter-phase switch in each set of inter-phase switches, and the tail end of the first sub-winding is connected to the tail end of the second sub-winding. A direction of a magnetic field generated by the first sub-winding set is opposite to a direction of a magnetic field generated by the second sub-winding set. The magnetic fields generated by the two sub-windings are canceled, and a magnetic field generated by the stator winding approaches zero, which in turn reduces the air gap magnetic flux density and the magnetic density on the rotor, thereby reducing motor vibration and heat generated by the rotor.

Figure 5:
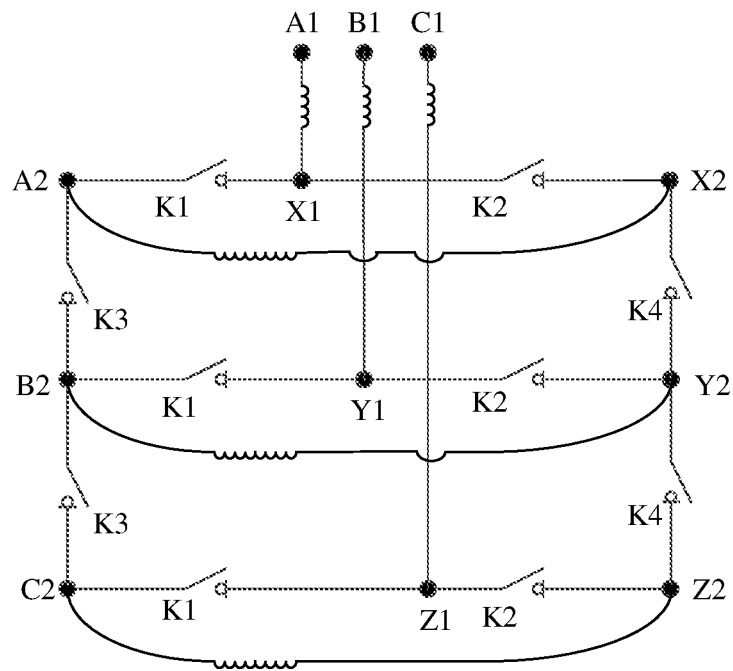
FIG. 5 is a schematic diagram of a connection between a stator winding and switches according to a third embodiment of this application.
Figure 6:
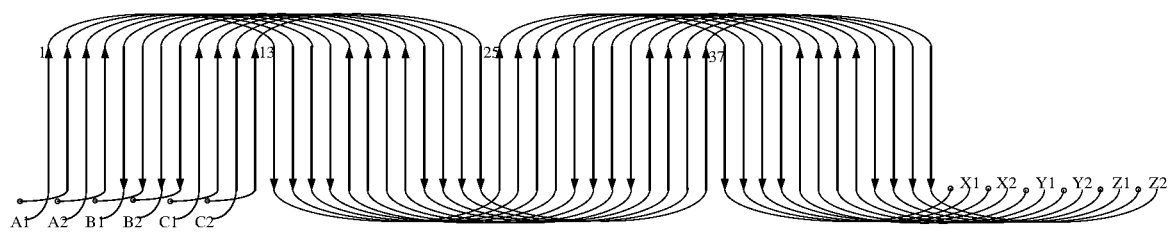
FIG. 6 is a schematic structural diagram of a stator winding according to a third embodiment of this application.

The following describes a switch switching process by using a three-phase motor as an example. As shown in FIG. 5 and FIG. 6, head ends of the first sub-windings A1X1 of phase A, phase B, and phase C are connected to a traction battery through an inverter, and the first intra-phase switch K1 is connected between the tail end of the first sub-winding A1X1 and the head end A2 of the second sub-winding A2X2 in the phase A winding, and the second intra-phase switch K2 is connected between the tail end of the first sub-winding A1X1 and the tail end X2 of the second sub-winding A2X2 in the phase A winding. The switch connection types in phase B and phase C are the same as that in phase A, and details are not described herein again.

The first inter-phase switch K3 is connected between the head end A2 of the second sub-winding A2X2 of the phase A stator winding and the head end B2 of the second sub-winding B2Y2 of the phase B stator winding. The second inter-phase switch K4 is connected between the tail end X2 of the second sub-winding A2X2 of the phase A stator winding and the tail end of the second sub-winding B2Y2 of the phase B stator winding. The switch connection types between phase B and phase C and between phase A and phase C are the same as the switch connection type between phase A and phase B, and details are not described herein again.

When the motor operates in power output mode, the first intra-phase switch K1 in each set of intra-phase switches and the second inter-phase switch K4 in each set of inter-phase switches are closed, so that the tail end of the first sub-winding is connected to the head end of the second sub-winding, the tail ends of the second sub-windings of the phases are connected to each other, and the head ends of the first sub-windings of the phases are connected to the traction battery through the inverter. When the motor operates in heating mode, the second intra-phase switch K2 in each set of intra-phase switches and the first inter-phase switch K3 in each set of inter-phase switches are closed, so that the tail end of the first sub-winding is connected to the tail end of the second sub-winding, the head ends of the second sub-windings of the phases are connected to each other, and the head ends of the first sub-windings of the phases are connected to the traction battery through the inverter.

For the motor according to this embodiment of this application, when the motor operates in heating mode, the second intra-phase switch in each set of intra-phase switches and the first inter-phase switch in each set of inter-phase switches are closed, so that the tail end of the first sub-winding is connected to the tail end of the second sub-winding. The two sub-winding sets generate opposite magnetic fields, the magnetic fields are canceled, the strength of the magnetic field inside each phase stator winding approaches zero, and the air gap magnetic flux is reduced to reduce motor vibration and heat generated by the rotor.

The following focuses on a structure of a motor in a fourth embodiment of this application. The motor in this application includes: stator windings of M phases, a stator core, and a rotor. Different from the motor in the second embodiment, a first sub-winding set includes N first sub-windings, and a second sub-winding set includes N second sub-windings, where N is an integer greater than 1. To be specific, the first sub-winding set includes two or more first sub-windings, and the second sub-winding set includes two or more second sub-windings.

When the motor operates in power output mode, a tail end of the $i^{th}$ first sub-winding is connected to a head end of the $i^{th}$ second sub-winding, and a tail end of the $j^{th}$ second sub-winding is connected to a head end of the $(j+1)^{th}$ first sub-winding, where $1 \leq i \leq N$, and $1 \leq j \leq N-1$. A wire winding direction of the first sub-winding is the same as a wire winding direction of the second sub-winding, a direction of a magnetic field generated by the $i^{th}$ first sub-winding is the same as a direction of a magnetic field generated by the $i^{th}$ second sub-winding, and the magnetic fields are superimposed and become stronger to generate mechanical power.

When the motor operates in heating mode, a tail end of the $i^{th}$ first sub-winding is connected to a tail end of the $i^{th}$ second sub-winding, and a head end of the $j^{th}$ second sub-winding is connected to a head end of the $(j+1)^{th}$ first sub-winding, where $1 \leq i \leq N$, and $1 \leq j \leq N-1$. A wire winding direction of the first sub-winding is the same as a wire winding direction of the second sub-winding, a direction of a magnetic field generated by the $i^{th}$ first sub-winding is opposite to a direction of a magnetic field generated by the $i^{th}$ second sub-winding, and the magnetic fields cancel each other out, and the magnetic fields inside each phase stator winding are reduced.

Figure 7:
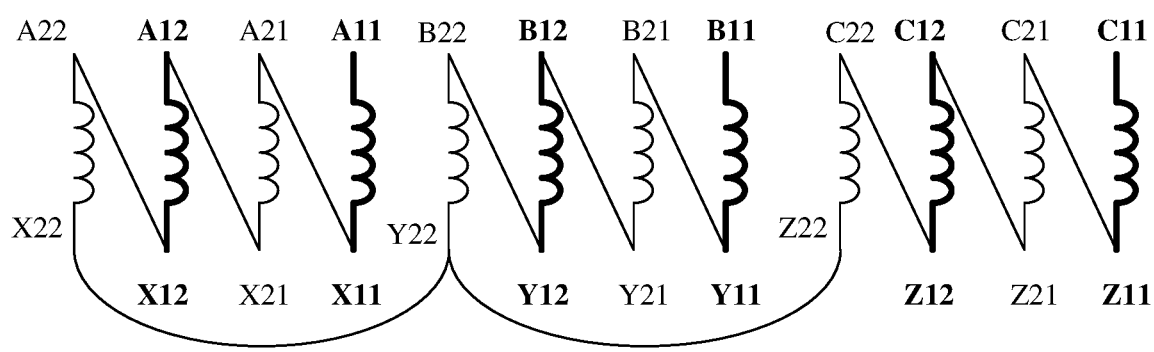
FIG. 7 is a schematic diagram of stator winding connection of a motor according to a fourth embodiment of this application in power output mode.
Figure 8:
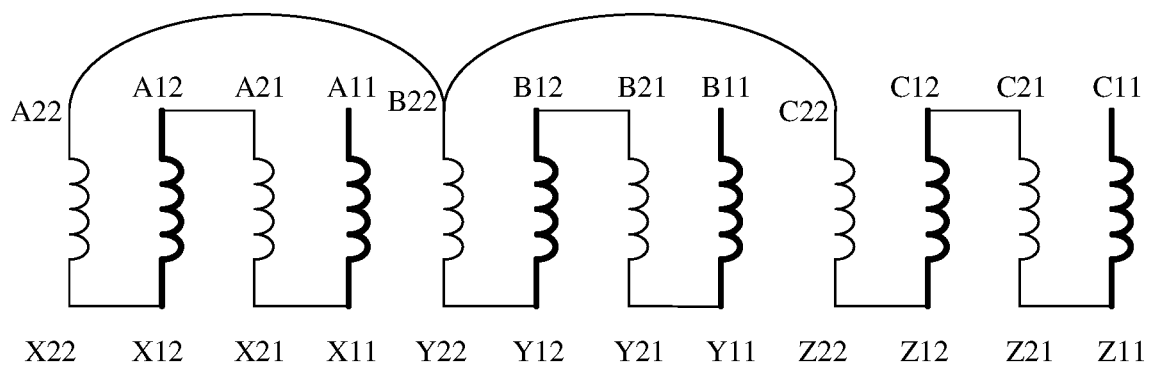
FIG. 8 is a schematic diagram of stator winding connection of a motor according to a fourth embodiment of this application in heating mode.

The following takes N=2 as an example, and describes the connection types of the sub-windings with reference to FIG. 7 and FIG. 8. The divided phase A winding includes the $1^{st}$ first sub-winding A11X11 and the $2^{nd}$ first sub-winding A12X12, and the $1^{st}$ second sub-winding A21X21 and the $2^{nd}$ second sub-winding A22X22. The divided phase B winding includes the 1$^{st}$ first sub-winding B11Y11 and the 2$^{nd}$ first sub-winding B12Y12, and the 1$^{st}$ second sub-winding B21Y21 and the 2$^{nd}$ second sub-winding B22Y22. The divided phase C winding includes the 1$^{st}$ first sub-winding C11Z11 and the 2$^{nd}$ first sub-winding C12Z12, and the 1$^{st}$ second sub-winding C21Z21 and the 2$^{nd}$ second sub-winding C22Z22.

Still referring to FIG. 7, when the motor operates in power output mode, the sub-windings in each phase winding are connected in series. A tail end X11 of the 1$^{st}$ first sub-winding A11X11 is connected to a head end A21 of the 1$^{st}$ second sub-winding A21X21, a tail end X21 of the 1$^{st}$ second sub-winding A21X21 is connected to a head end A12 of the 2$^{nd}$ first sub-winding A12X12, and a tail end X12 of the 2$^{nd}$ first sub-winding A12X12 is connected to a head end A22 of the 2$^{nd}$ second sub-winding A22X22. The connection types in phase B and phase C are the same as that in phase A, and details are not described herein again. A direction of a magnetic field generated by the first sub-winding set is the same as a direction of a magnetic field generated by the second sub-winding set. The magnetic fields generated by the two sub-windings are superimposed and become stronger, a magnetic field generated by the stator winding interacts with a magnetic field generated by the rotor, and the rotor is driven to rotate to output power.

As shown in FIG. 8, when the motor operates under the heat mode, the tail end X11 of the 1$^{st}$ first sub-winding A11X11 is connected to the tail end X21 of the 1$^{st}$ second sub-winding A21X21, the head end A21 of the 1$^{st}$ second sub-winding A21X21 is connected to the head end A12 of the 2$^{nd}$ first sub-winding A12X12, and the tail end X12 of the 2$^{nd}$ first sub-winding A12X12 is connected to a tail end X22 of the 2$^{nd}$ second sub-winding A22X22. The connection types in phase B and phase C are the same as that in phase A, and details are not described herein again. A direction of a magnetic field generated by the first sub-winding set is opposite to a direction of a magnetic field generated by the second sub-winding set, the magnetic fields generated by the two sub-windings are canceled, and the magnetic fields generated by the stator winding are reduced, which in turn reduces the air gap magnetic flux density and the magnetic density on the rotor, thereby reducing motor vibration and heat generated by the rotor.

For the motor according to this embodiment of this application, when the motor operates in heating mode, the two sub-winding sets generate opposite magnetic fields, and the magnetic fields are canceled, so that the strength of the magnetic field inside each phase stator winding approaches zero, which in turn reduces the air gap magnetic flux, thereby reducing motor vibration and heat generated by the rotor.

The following focuses on a heating control method in a fifth embodiment of this application. The control method includes the following steps.

S201. Obtain a cell temperature of a traction battery and operating state information of a motor.

The cell temperature of the traction battery is acquired by a temperature sensor disposed inside the traction battery.

In some embodiments, the traction battery includes a battery management system. The battery management system obtains a traction battery temperature, and transmits battery temperature information to a motor controller unit, where the motor includes the motor controller unit. The motor controller unit receives the battery temperature information.

In some embodiments, the motor controller unit also receives the operating state information of the motor. The operating state information of the motor includes: a temperature of a motor stator, a temperature of a motor stator winding, the motor being in heating mode or power output mode, the motor being in a locked-rotor state, and/or the motor being in a stopped state, which are not specifically limited herein.

S202. Determine whether the cell temperature and the operating state of the motor satisfy a heating condition. Under the condition that a determining result is yes, go to S203; otherwise, go to S204 or keep the motor in the stopped state.

In some embodiments, the heating condition includes that the cell temperature of the traction battery is lower than a preset temperature threshold and the motor is in the locked-rotor state, where the preset temperature threshold is determined based on a rated operating temperature of the traction battery.

In some embodiments, the heating condition includes that the cell temperature of the traction battery is lower than a preset temperature threshold and the motor is in the stopped state.

In some embodiments, the heating condition includes that the cell temperature of the traction battery is lower than a preset temperature threshold, the motor is in the locked-rotor state, and a temperature of the motor stator and a temperature of the motor stator winding are lower than a preset motor temperature threshold, where the preset motor temperature threshold is determined based on the rated operating temperature of the traction battery.

A person skilled in the art should understand that the heating condition can be set based on needs, which is not limited herein.

S203. Connect a tail end of the first sub-winding to a tail end of the second sub-winding. The second intra-phase switch is connected between a tail end of a first sub-winding and a tail end of a second sub-winding in one phase stator winding. The first inter-phase switch is connected between a head end of a second sub-winding of one phase stator winding and a head end of a second sub-winding of another phase stator winding. The motor controller unit controls to close the second intra-phase switch in each set of intra-phase switches and the first inter-phase switch in each set of inter-phase switches, so that the tail end of the first sub-winding is connected to the tail end of the second sub-winding.

S204. Connect the tail end of the first sub-winding to the head end of the second sub-winding.

The first intra-phase switch is connected between a tail end of a first sub-winding and a head end of a second sub-winding in one phase stator winding, and the second inter-phase switch is connected between a tail end of the second sub-winding of the one phase stator winding and a tail end of the second sub-winding of the another phase stator winding. The motor controller unit controls to close the first intra-phase switch in each set of intra-phase switches and the second inter-phase switch in each set of inter-phase switches, so that the tail end of the first sub-winding is connected to the tail end of the second sub-winding.

In the heating control method according to this embodiment of this application, when the motor operates in heating mode, the second intra-phase switch in each set of intra-phase switches and the first inter-phase switch in each set of inter-phase switches are closed, so that the tail end of the first sub-winding is connected to the tail end of the second sub-winding. When the first sub-winding and the second sub-winding are energized, the two sub-winding sets generate opposite magnetic fields, the magnetic fields are canceled, the strength of the magnetic field inside each phase stator winding is reduced, and the air gap magnetic flux is reduced, thereby reducing motor vibration and heat generated by the rotor.

In some embodiments, after S203, the foregoing method further includes S205.

S205. Control a state of the inverter, so that the battery energizes the first sub-winding and the second sub-winding, and a direction of a total magnetic field generated by the first sub-winding set is opposite to a direction of a total magnetic field generated by the second sub-winding set.

The inverter includes a switch assembly, and the stator winding of the motor is connected to the traction battery through the switch assembly. The motor controller unit controls on/off state of the switch assembly. When a closed circuit is formed by the battery and one phase stator winding or stator windings of M phases, the phase stator winding or windings store electrical energy. When the circuit formed by the battery and the phase stator winding or the stator windings of M phases is disconnected, due to the inductance characteristic of the stator winding, the phase stator winding or the stator windings of M phases further apply currents to the battery, so that alternating current excitation is generated in the circuit connecting the stator windings of M phases and the battery, and the traction battery uses its internal resistance for heating. In this case, because the tail end of the first sub-winding is connected to the tail end of the second sub-winding, directions of magnetic fields generated by the first sub-winding set and the second sub-winding set are opposite. Through the settings of the number of turns and the wires of the first sub-winding and the second sub-winding, the magnetic fields can be entirely or partially canceled, the strength of the magnetic field inside each phase stator winding is reduced, and the air gap magnetic flux is reduced, thereby reducing motor vibration and heat generated by the rotor.

In conclusion, it should be noted that the foregoing embodiments are merely intended for describing the technical solutions of this application but not for limiting this application. Although this application is described in detail with reference to such embodiments, persons of ordinary skill in the art should understand that they may still make modifications to the technical solutions described in the embodiments or make equivalent replacements to some or technical features thereof, without departing from the scope of the technical solutions of the embodiments of this application.

What is claimed is:

1. A motor, comprising: stator windings of M phases, wherein M is a positive integer, each phase stator winding comprises a first sub-winding set and a second sub-winding set, and the motor is used to heat a traction battery; and
when the motor heats the traction battery so as to energize the first sub-winding set and the second sub-winding set, a direction of a total magnetic field generated by the first sub-winding set is caused to be opposite to a direction of a total magnetic field generated by the second sub-winding set,
wherein the first sub-winding set comprises a first sub-winding, and the second sub-winding set comprises a second sub-winding; the first sub-winding comprises a head end and a tail end, and the second sub-winding comprises a head end and a tail end; when the motor heats the traction battery, the tail end of the first sub-winding is connected to the tail end of the second sub-winding; and wherein:
the motor further comprises M sets of intra-phase switches, wherein each set of intra-phase switches comprises a first intra-phase switch and a second intra-phase switch; and
the first intra-phase switch is connected between the tail end of the first sub-winding and the head end of the second sub-winding in one phase stator winding, and the second intra-phase switch is connected between the tail end of the first sub-winding and the tail end of the second sub-winding in the phase stator winding.

2. The motor according to claim 1, wherein the motor further comprises M sets of inter-phase switches, wherein each set of inter-phase switches comprises a first inter-phase switch and a second inter-phase switch; and
the first inter-phase switch is connected between the head end of the second sub-winding of one phase stator winding and the head end of the second sub-winding of another phase stator winding, and the second inter-phase switch is connected between the tail end of the second sub-winding of the one phase stator winding and the tail end of the second sub-winding of the another phase stator winding.

3. The motor according to claim 1, wherein the first sub-winding set comprises N first sub-windings, and the second sub-winding set comprises N second sub-windings, wherein N is an integer greater than 1; and
when the motor heats the traction battery, a tail end of the ith first sub-winding is connected to a tail end of the ith second sub-winding, and a head end of the jth second sub-winding is connected to a head end of the (j+1)th first sub-winding, wherein $1 \leq i \leq N$, and $1 \leq j \leq N-1$.

4. The motor according to claim 1, wherein a wire winding direction of each first sub-winding is the same as a wire winding direction of each second sub-winding.

5. The motor according to claim 1, wherein the motor further comprises a rotor; and
when the motor heats the traction battery, the rotor is at rest.

6. A heating control method, wherein the method is applied to the motor according to claim 1, the motor is connected to a traction battery through an inverter, the motor comprises stator windings of M phases, each phase stator winding comprises a first sub-winding and a second sub-winding, and the method comprises:
receiving a cell temperature of the traction battery and operating state information of the motor;
determining whether a heating condition is met based on the cell temperature and the operating state information; and
connecting a tail end of the first sub-winding to a tail end of the second sub-winding under the condition that a determining result is yes.

7. The method according to claim 6, wherein after the connecting a tail end of the first sub-winding to a tail end of the second sub-winding under the condition that a determining result is yes, the method further comprises:
controlling a state of the inverter, so that when the traction battery energizes the first sub-winding and the second sub-winding, a direction of a total magnetic field generated by the first sub-winding set is opposite to a direction of a total magnetic field generated by the second sub-winding set.

8. The method according to claim 6, wherein the motor further comprises:
M sets of inter-phase switches and M sets of intra-phase switches, wherein each set of inter-phase switches comprises a first inter-phase switch and a second inter-phase switch, and each set of intra-phase switches comprises a first intra-phase switch and a second intra-phase switch; and the connecting a tail end of the first sub-winding to a tail end of the second sub-winding under the condition that a determining result is yes specifically comprises:

closing the second intra-phase switch in each set of intra-phase switches and the first inter-phase switch in each set of inter-phase switches.

9. A power system, wherein the system comprises: a traction battery, an inverter, and the motor according to claim 1, wherein the motor heats the traction battery through the inverter.

10. An electric vehicle, characterized by comprising a power system, wherein the power system comprises:

a traction battery, an inverter, and the motor according to claim 1, wherein the motor heats the traction battery through the inverter.

* * * * *